United States Patent
Park et al.

(10) Patent No.: US 9,456,352 B2
(45) Date of Patent: Sep. 27, 2016

(54) METHOD AND APPARATUS FOR TRANSMITTING INTERFERENCE INFORMATION

(71) Applicant: LG Electronics Inc., Seoul (KR)

(72) Inventors: Hanjun Park, Seoul (KR); Jonghyun Park, Seoul (KR); Kijun Kim, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 14/307,693

(22) Filed: Jun. 18, 2014

(65) Prior Publication Data

US 2014/0376461 A1 Dec. 25, 2014

Related U.S. Application Data

(60) Provisional application No. 61/837,142, filed on Jun. 19, 2013.

(51) Int. Cl.
| | | |
|---|---|---|
| H04W 16/14 | (2009.01) | |
| H04W 72/04 | (2009.01) | |
| H04W 48/00 | (2009.01) | |
| H04L 1/00 | (2006.01) | |
| H04L 5/00 | (2006.01) | |
| H04W 72/00 | (2009.01) | |
| H04L 1/16 | (2006.01) | |

(52) U.S. Cl.
CPC ............ *H04W 16/14* (2013.01); *H04L 1/0041* (2013.01); *H04L 1/0045* (2013.01); *H04L 1/0061* (2013.01); *H04L 1/0072* (2013.01); *H04L 5/00* (2013.01); *H04W 48/00* (2013.01); *H04L 1/1671* (2013.01); *H04W 72/00* (2013.01)

(58) Field of Classification Search
CPC ............ H04W 16/14; H04W 72/0466; H04W 72/12; H04W 56/003; H04W 72/042; H04L 5/0048; H04L 5/0053; H04B 7/024
See application file for complete search history.

(56) References Cited

U.S. PATENT DOCUMENTS

| | | | |
|---|---|---|---|
| 8,923,905 B2* | 12/2014 | Montojo | H04B 7/024 455/507 |
| 2013/0223366 A1* | 8/2013 | Papasakellariou | H04W 72/042 370/329 |
| 2013/0336193 A1* | 12/2013 | Luo | H04W 16/14 370/312 |
| 2014/0018086 A1* | 1/2014 | Guo | H04L 5/0048 455/450 |
| 2014/0293971 A1* | 10/2014 | Yoo | H04W 56/003 370/336 |
| 2015/0245324 A1* | 8/2015 | Kim | H04L 5/0053 370/329 |
| 2015/0295695 A1* | 10/2015 | Davydov | H04W 72/12 370/329 |

* cited by examiner

*Primary Examiner* — Chi H Pham
*Assistant Examiner* — Shailendra Kumar
(74) *Attorney, Agent, or Firm* — Morgan, Lewis & Bockius LLP

(57) ABSTRACT

A method for receiving interference cancellation information of a mobile station (MS), which is performed by the MS, includes receiving a virtual radio network temporary identifier (V-RNTI) set including a plurality of V-RNTIs for cancellation of an interference signal from a serving base station, each of the plurality of V-RNTIs being associated with RNTIs of one or more MSs (hereinafter, referred to as "neighboring MSs) served by a neighboring base station, and receiving a downlink control channel for a first neighboring MS of the neighboring MSs using at least one V-RNTI of the V-RNTI set. The downlink control channel is a double CRC-downlink control channel with a first cyclic redundancy check (CRC) bit scrambled by an RNTI of the first neighboring MS and a second CRC bit scrambled by the at least one V-RNTI and is received in a specific subframe.

12 Claims, 9 Drawing Sheets

METHOD AND APPARATUS FOR TRANSMITTING INTERFERENCE INFORMATION

This application claims the benefit of U.S. Provisional Application No. 61/837,142, filed on Jun. 19, 2013, which is hereby incorporated by reference as if fully set forth herein.

BACKGROUND OF THE INVENTION

1. Field of the Invention

The present invention relates to a wireless communication system, and more particularly, to a method and apparatus for transmitting and receiving interference cancellation information.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed a method and apparatus for transmitting and receiving interference cancellation information that substantially obviates one or more problems due to limitations and disadvantages of the related art.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for receiving interference cancellation information of a mobile station (MS), which is performed by the MS, includes receiving a virtual radio network temporary identifier (V-RNTI) set including a plurality of V-RNTIs for cancellation of an interference signal from a serving base station, each of the plurality of V-RNTIs being associated with RNTIs of one or more MSs (hereinafter, referred to as "neighboring MSs) served by a neighboring base station, and receiving a downlink control channel for a first neighboring MS of the neighboring MSs using at least one V-RNTI of the V-RNTI set. The downlink control channel may be a double CRC-downlink control channel with a first cyclic redundancy check (CRC) bit scrambled by an RNTI of the first neighboring MS and a second CRC bit scrambled by the at least one V-RNTI and be received in a specific subframe.

Preferably, the double CRC-downlink control channel may be received in a search space determined by the at least one V-RNTI Preferably, the method may further comprise detecting interference data caused due to the neighboring base station using information included in the received double CRC-downlink control channel; and cancelling the detected interference data from total received data.

Preferably, the V-RNTI set may be received via a higher layer signal.

Preferably, the method may further comprise acquiring an RNTI for the first neighboring MS from the double CRC-downlink control channel; and receiving a downlink control channel for the first neighboring MS using the acquired RNTI for the first neighboring MS after the specific subframe.

Preferably, the method may further comprise receiving information on the specific subframe via a higher layer signal.

In another aspect of the present invention, a method for transmitting interference cancellation information of a mobile station (MS), which is performed by a base station, includes configuring a virtual radio network temporary identifier (V-RNTI) set including a plurality of V-RNTIs for cancellation of an interference signal, each of the plurality of V-RNTIs being associated with RNTIs of one or more serving MSs, and transmitting a downlink control channel for a first serving MS of the at least one serving MSs. The downlink control channel may be a double CRC-downlink control channel with a first cyclic redundancy check (CRC) bit scrambled by an RNTI of the first serving MS and a second CRC bit scrambled by the at least one V-RNTI of the V-RNTI set and be transmitted in a specific subframe.

Preferably, the double CRC-downlink control information may be transmitted in a search space determined by the at least one V-RNTI.

Preferably, the method may further comprise transmitting information on the specific subframe to a neighboring base station.

Preferably, the method may further comprise transmitting the V-RNTI set to a neighboring base station in order to transmit the V-RNTI set to an MS served by the neighboring base station.

In another aspect of the present invention, a mobile station (MS) configured to receive interference cancellation information includes a radio frequency (RF) unit and a processor configured to control the RF unit. The processor is configured to receive a virtual radio network temporary identifier (V-RNTI) set including a plurality of V-RNTIs for cancellation of an interference signal from a serving base station, each of the plurality of V-RNTIs being associated with RNTIs of one or more MSs (hereinafter, referred to as "neighboring MSs) served by a neighboring base station; and to receive a downlink control channel for a first neighboring MS of the neighboring MSs using at least one V-RNTI of the V-RNTI set. The downlink control channel for the first neighboring MS may be a double CRC-downlink control channel with a first cyclic redundancy check (CRC) bit scrambled by an RNTI of the first neighboring MS and a second CRC bit scrambled by the at least one V-RNTI and be received in a specific subframe.

In another aspect of the present invention, a base station configured to transmit interference cancellation information includes a radio frequency (RF) unit and a processor configured to control the RF unit. The processor is configured to configure a virtual radio network temporary identifier (V-RNTI) set including a plurality of V-RNTIs for cancellation of an interference signal, each of the plurality of V-RNTIs being associated with RNTIs of one or more serving MSs; and to transmit a downlink control channel for a first serving MS of the at least one serving MSs. The downlink control channel for the first serving MS may be a double CRC-downlink control channel with a first cyclic redundancy check (CRC) bit scrambled by an RNTI of the first serving MS and a second CRC bit scrambled by at least one V-RNTI of the V-RNTI set and be transmitted in a specific subframe.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
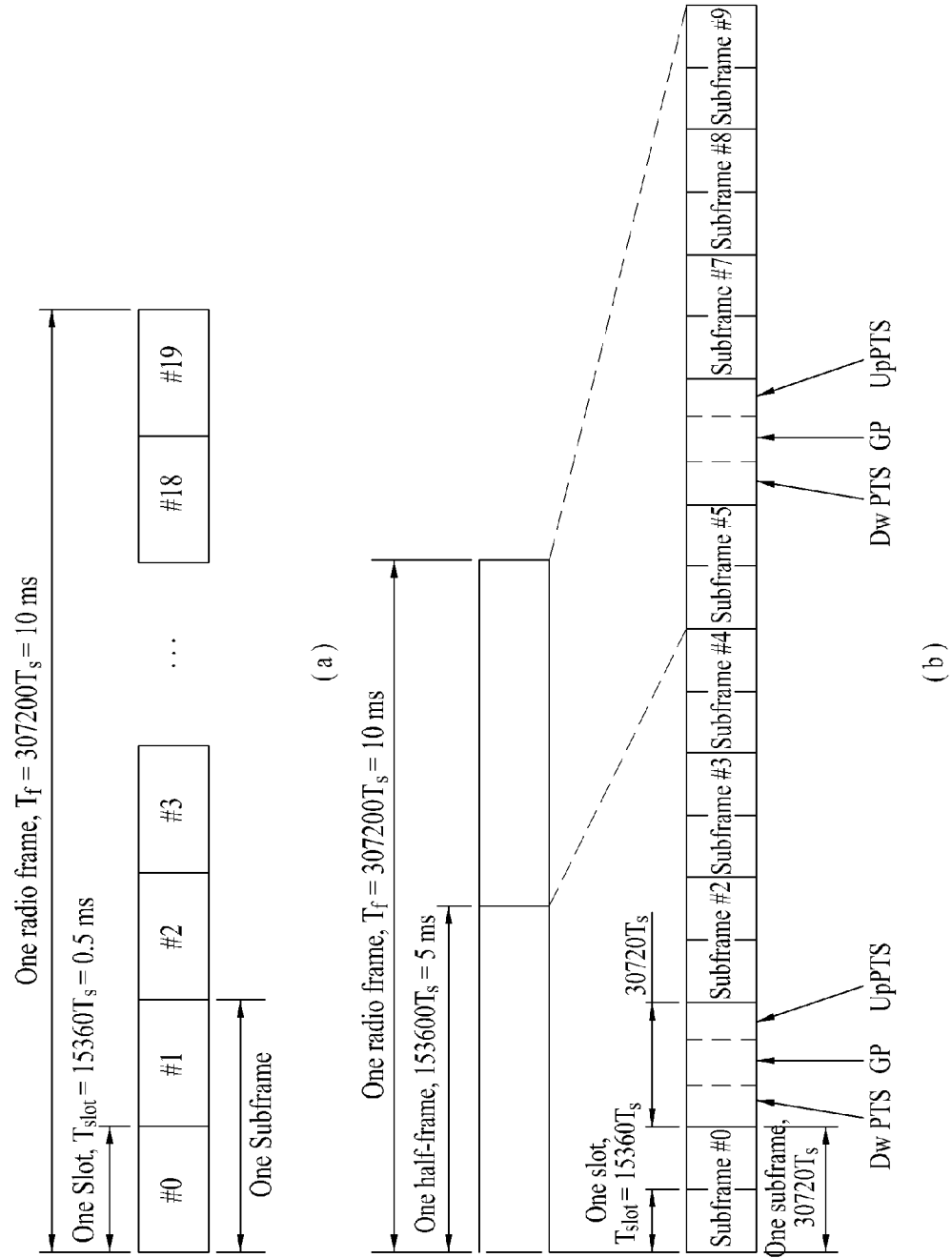
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for unlink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
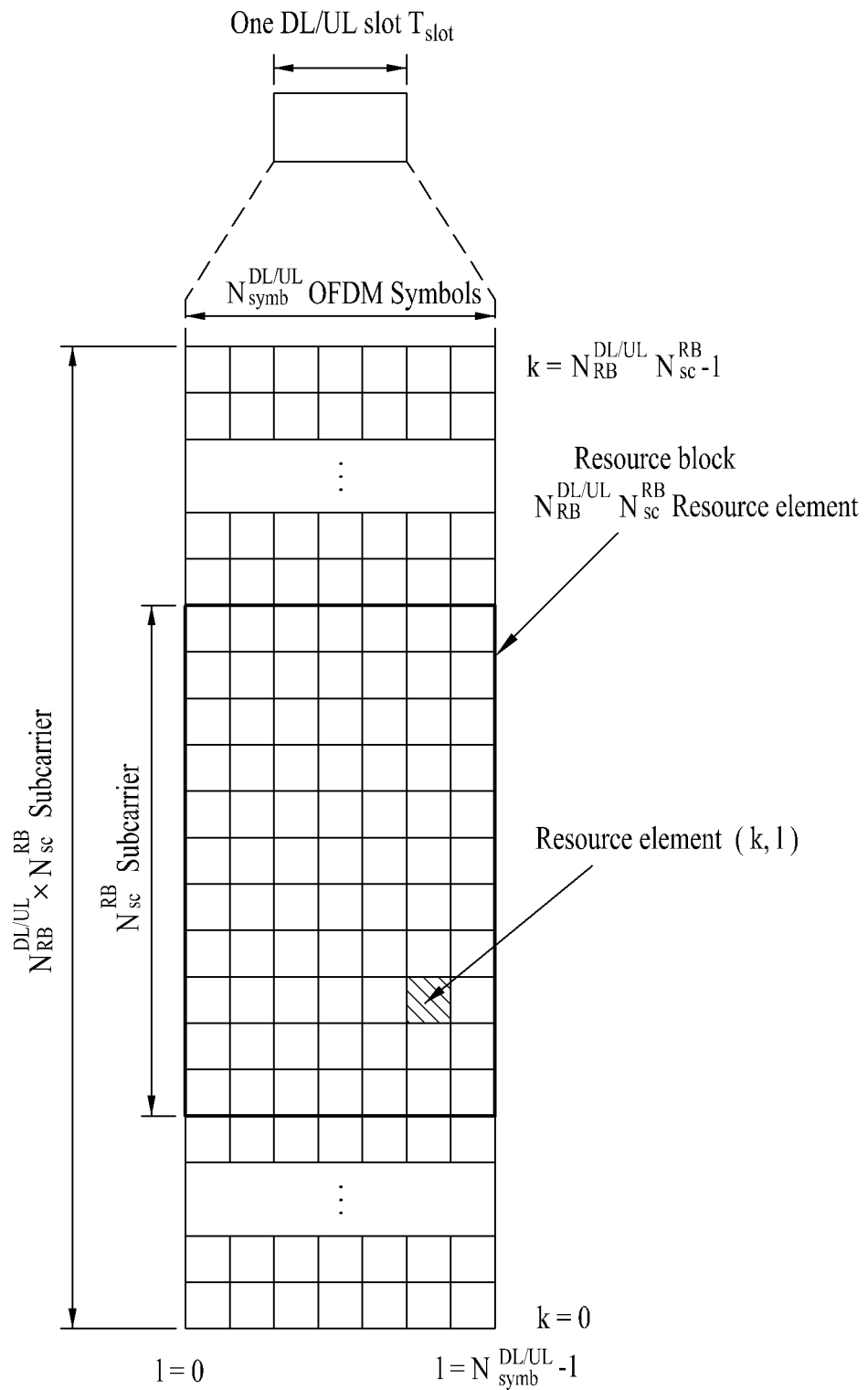
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
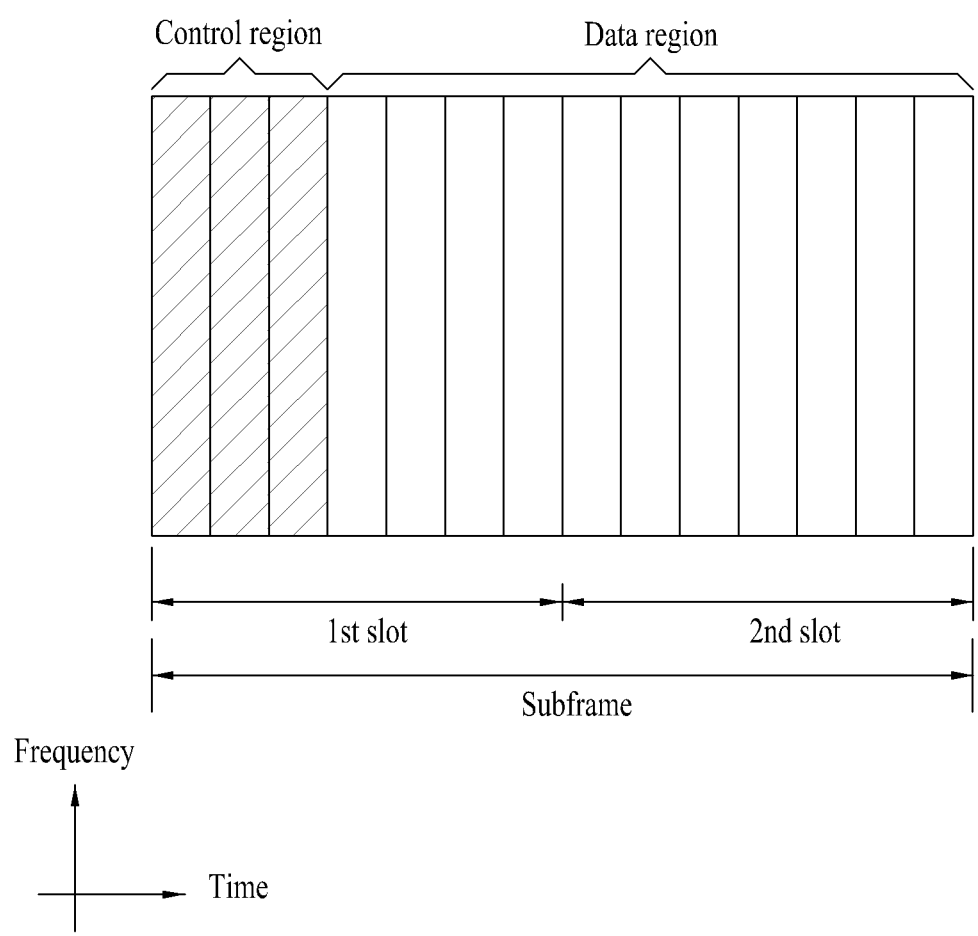
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
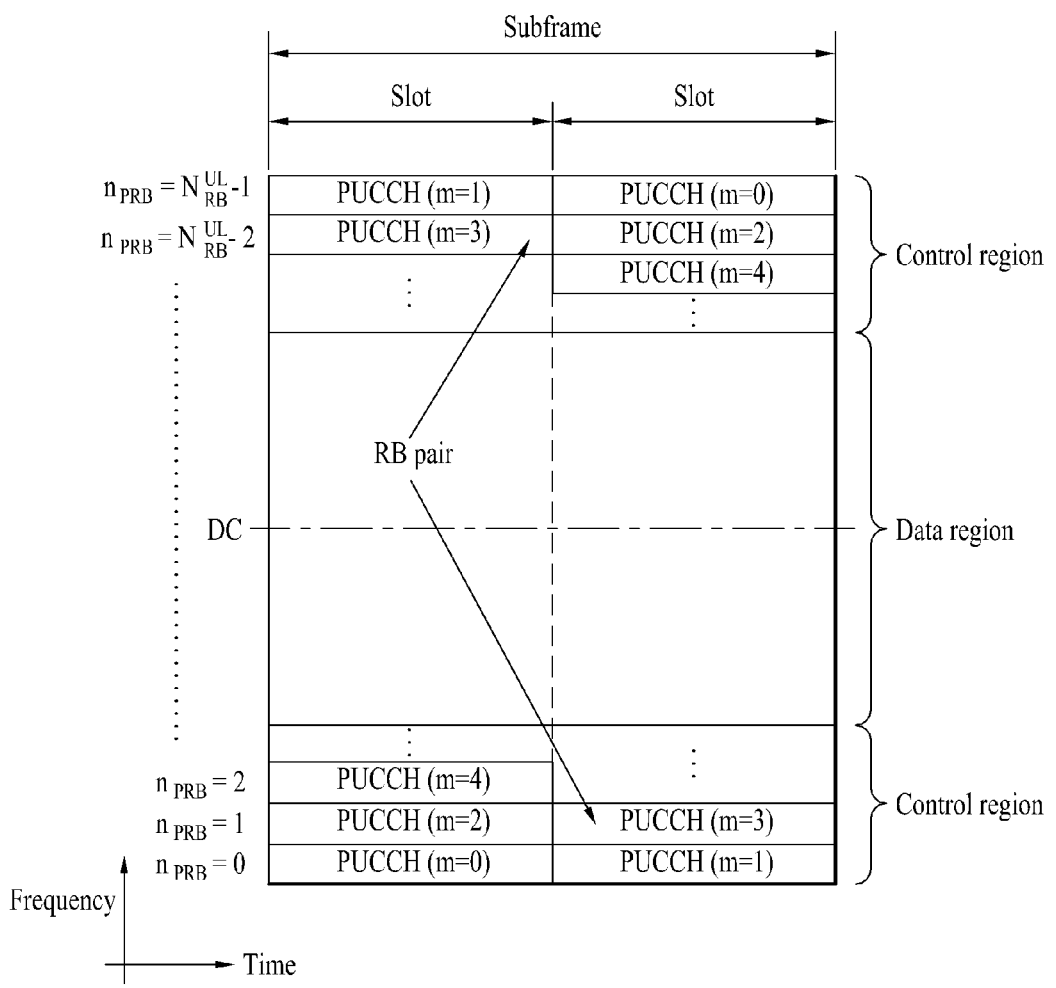
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |

TABLE 3-continued

| PUCCH format | Modulation scheme | Number of bits per subframe, $M_{bit}$ | Usage | Etc. |
| --- | --- | --- | --- | --- |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In the present invention, assume a wireless communication system in which a plurality of user equipments (UEs), which receives a service from a single base station or transmission point, exists and each UE has a UE identifier for identifying downlink control information transmitted thereto. In the wireless communication system, when a specific UE may apply an interference cancellation (IC) scheme through a decoding or demodulation process to interference data received from a neighboring base station or transmission point, a method for enabling the UE supporting the IC scheme to use downlink control information of the interference data is considered.

In a wireless communication system such as LTE, in order to inform a UE, which receives data, of resource allocation information of downlink data, modulation scheme, channel coding information, hybrid automatic retransmit request (HARQ) information, power information, etc., downlink control information (DCI) is transmitted via a PDCCH region. At this time, the UE should check DCI transmitted thereto and a UE identifier may be designed for transmission along with the DCI. As described above, in an LTE system, cyclic redundancy check (CRC) 16 bits are attached to the DCI for the purpose of discriminating transmission error of DCI transmission. At this time, the CRC 16 bits are scrambled by a radio network temporary identity (RNTI), which is a UE identifier, to transmit unique DCI to the UE. At this time, in the LTE system, the UE may receive DCI format 1A for fallback operation and DCI format (e.g., DCI format 2C) supporting a MIMO scheme according to a transmission mode (TM) thereof and performs blind decoding (BD) with respect to the two DCI formats.

A search space (SS) for performing BD may be estimated using an RNTI value applied to DCI and an aggregation level of the DCI as follows.

In an LTE system, a control region of a serving cell is composed of $N_{CCE,k}$ CCEs at a k-th subframe and the UE should monitor a PDCCH candidate set on one or more activated serving cells as set by higher layer signaling for control information. Here, monitoring means that the UE attempt to decode PDCCHs in the candidate set according to all monitored DCI formats. When an aggregation level is L, CCEs corresponding to PDCCH candidates m of a search space may be defined with respect to each serving cell, in which a PDCCH is monitored, as follows.

$$L\{(Y_k+m') \bmod \lfloor N_{CCE,k}/L \rfloor\}+i \qquad \text{Equation 1}$$

$Y_k$ is defined by the following equation, i is 0, ..., L−1, and m=m' with respect to a common search space. For a UE-specific search space, when carrier aggregation is configured with respect to the UE, m'=m+M$^{(L)}$·n$_{CI}$, n$_{CI}$ is a carrier indicator field value and, when carrier aggregation is not configured with respect to the UE, m'=m, m=0, ..., M$^{(L)}$−1, and M$^{(L)}$ is the number of PDCCH candidates to be monitored in a given search space.

For a common search space, $Y_k$ is set to 9 with respect to two aggregation levels 4 and 8. For a UE-specific search space, $Y_k$ is defined as follows.

$$Y_k=(A \cdot Y_{k-1}) \bmod D \qquad \text{Equation 2}$$

where, $Y_{-1}=n_{RNTI} \neq 0$, A=39827, D=65537, k=$\lfloor n_s/2 \rfloor$, and $n_s$ denotes a slot number of a radio frame.

At this time, the UE descrambles each DCI using an RNTI thereof. Next, the UE checks CRC bits and determines that the DCI is transmitted thereto when an error is not detected.

The RNTI means a C(cell)-RNTI of an LTE system and one of values excluding an RA-RNTI allocated for random access may be selected.

First Embodiment

DCI Transmission Including Double CRC at a Specific Time or on a Specific Subframe In an advanced wireless communication system such as LTE Rel-12, a network based IC scheme or network assisted IC (NA-IC) scheme for cancelling interference data from an adjacent cell or transmission point based on assistance of a network has been discussed. When performing the NA-IC scheme, DCI information of interference data included in a data region will be used. For example, when information about a resource region in which interference data is transmitted, of the data region, modulation information, etc. are known, it is possible to more accurately perform detection of interference data in symbol units and an interference cancellation operation. In addition, when a UE supporting the NA-IC scheme has sufficient hardware capabilities and thus performs codeword detection of interference data from a neighboring cell, DCI information of the interference data of the neighboring cell is necessary. Accordingly, the UE supporting the NA-IC scheme may advantageously detect DCI information of the interference data of the neighboring cell. However, in a current LTE system, the interference data of the neighboring cell is data of another UE (hereinafter, referred to as a "neighboring cell UE") served by the neighboring cell and CRC bits may be checked by a C-RNTI of the neighbor cell UE only. Accordingly, when DCI (hereinafter, referred to as "neighboring cell DCI") transmitted by the neighboring cell is detected without checking the CRC bits using the C-RNTI, the neighboring cell DCI is used in a state in which error of the neighboring cell DCI is not checked and thus reliability decreases.

As one method for solving the above-described problem, a UE supporting an NA-IC scheme (hereinafter, referred to as an "NA-IC UE") is informed of C-RNTI information of neighboring cell UEs. However, UEs scheduled by neighboring cells or transmission points may be dynamically changed within a relatively short time. When it is assumed that N arbitrary UEs are simultaneously scheduled, dynamically delivering RNTI related information of a maximum of N*16 bits to the NA-IC UE according to scheduling change may lead to overload and deteriorate system efficiency.

Accordingly, when an identifier of a UE which is currently scheduled by a neighboring cell is $RNTI_1(n)$ and a virtual UE identifier, of which the NA-IC UE is informed in advance, is $RNTI_2(m)$, the present invention proposes a method for transmitting DCI having double CRC, to which different RNTIs are applied, at a specific time by adding existing CRC bits, CRC bits other than $CRC_1$, and $CRC_2$ upon transmission of DCI corresponding to $RNTI_1(n)$ and applying $RNTI_2(m)$ to $CRC_2$. When the DCI having the double CRC is transmitted, the NA-IC UE can reliably detect the DCI using $RNTI_2(m)$ and $CRC_2$. When the DCI is successfully detected, the NA-IC UE may confirm that the UE having $RNTI_1(n)$ is currently scheduled by the neighboring cell. That is, the NA-IC UE may acquire $RNTI_1(n)$.

In the present invention, $RNTI_1$ and $RNTI_2$ may be composed of a set of one or more elements. At this time, the NA-IC UE may receive DCI having one element of $RNTI_1$ and one element of $RNTI_2$ at a specific time, confirm the elements of currently scheduled $RNTI_1$ in the DCI, perform BD with respect to an SS corresponding to a value of the elements of $RNTI_1$ and perform CRC error detection, thereby improving performance of the NA-IC scheme. Although detailed operations of the present invention are described with respect to an LTE system, the operations are applicable to arbitrary wireless communication system in which a UE confirms an SS of a resource region, in which DCI transmitted, via a UE identifier allocated thereto, in a control information transmission process and performs an error detection process using CRC scrambled by the UE identifier with respect to the DCI.

According to a detailed embodiment of the present invention, when a UE identifier set of a specific transmission point or base station is $RNTI_1$ (e.g., $RNTI_1(1)$, $RNTI_1(2)$, . . . ), a method for defining $RNTI_2$ (e.g., $RNTI_2(1)$, $RNTI_2(2)$, . . . ), which is a virtual UE identifier RNTI set, at the transmission point or base station, associating one or more elements (e.g., $RNTI_1(n)$, $RNTI_1(n+1)$, . . . ) of $RNTI_1$ with one element (e.g., $RNTI_2(m)$ of $RNTI_2$), informing, at a neighboring cell serving neighboring cell UEs, the neighboring cell UEs having the element of $RNTI_1$ corresponding to the element $RNTI_2(m)$ of $RNTI_2$ of information about $RNTI_2(m)$ as an identifier of the information about $RNTI_2$ (m) via a higher layer signal and informing, at a cell (transmission point or base station) serving the NA-IC UE, the NA-IC UE of information about the set $RNTI_2$ via a higher layer signal is proposed.

In an LTE system according to an embodiment of the present invention, when the NA-IC UE detects DCI of interference data for the purpose of supporting the NA-IC scheme, an RNTI applied to the DCI of the interference data should be known. Accordingly, the present invention defines a virtual RNTI set (e.g., $RNTI_2$) capable of being acquired by the NA-IC UE in advance in order to solve the above-described problem. At this time, the NA-IC UE may use $RNTI_2$ when detecting specific DCI including one element of $RNTI_2$ according to one embodiment of the present invention. At this time, the element of $RNTI_1$ corresponds to one element of $RNTI_2$ and information about $RNTI_2$ may be transmitted or provided to the neighboring cell UE having the element of $RNTI_1$ as an identifier via a higher layer signal such as RRC. In addition, information about the virtual UE identifier set $RNTI_2$ may be delivered to the NA-IC UE via a higher layer signal such as RRC.

Figure 5:
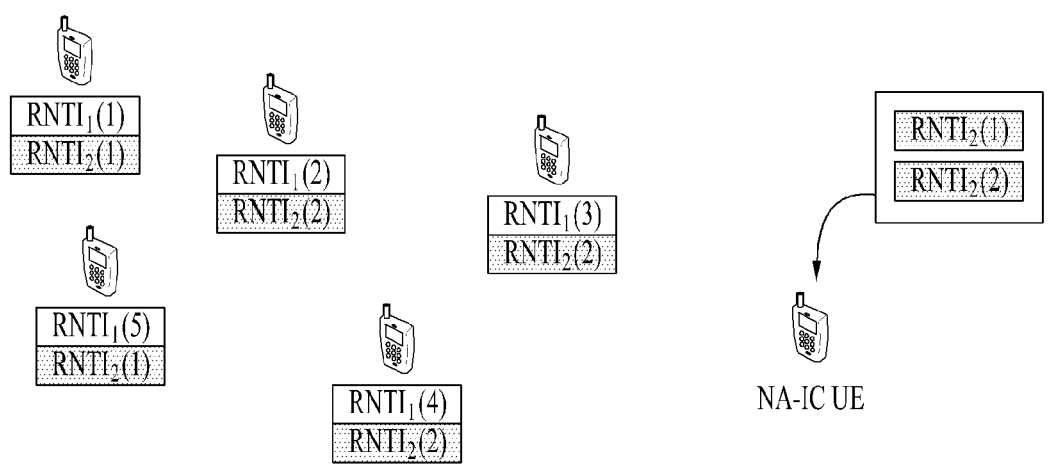
FIG. 5 shows relationship between RNTI (radio network temporary identifier)s according to one embodiment of the present invention.

FIG. 5 is a diagram showing an allocation relationship between two RNTIs according to one embodiment of the present invention. A UE has different $RNTI_1$ such as $RNTI_1(1)$, $RNTI_1(2)$, . . . , $RNTI_1(5)$ and has $RNTI_2(1)$ or $RNTI_2(2)$ which may be shared between some UEs. Information about an element of $RNTI_2$ corresponding to the element of $RNTI_1$ may be provided to the UE having the element of $RNTI_1$ via a higher layer signal. In addition, information about $RNTI_2$ (e.g., $RNTI_2(1)$, $RNTI_2(2)$) may be delivered to the NA-IC UE.

According to a detailed embodiment of the present invention, a method for including two CRCs (e.g., $CRC_1$ and $CRC_2$) in one piece of DCI at a specific time or on a specific subframe, scrambling $CRC_1$ by one element (e.g., $RNTI_1$ (n)) of a UE identifier set (e.g., $RNTI_1$) of a specific transmission point or base station and scrambling $CRC_2$ by one element (e.g., $RNTI_2(m)$) of a virtual UE identifier set (e.g., $RNTI_2$) defined by the transmission point or base station will be described. In this embodiment, the NA-IC UE should acquire RNTI information of a UE (that is, a neighboring cell UE) scheduled to receive interference data from a neighboring cell in order to detect DCI of the interference data of the neighboring cell. In the present invention, CRC bits for the NA-IC UE are added to existing DCI and the CRC bits may be scrambled by a virtual RNTI which is already known to the NA-IC UE via a serving base station.

Accordingly, according to the embodiment of the present invention, the specific DCI includes $CRC_1$ for an existing operation and an existing UE identifier $RNTI_1(n)$ applied to $CRC_1$ and includes $CRC_2$ for the NA-IC UE and a virtual UE identifier $RNTI_2(n)$ applied to $CRC_2$.

At this time, as described above, when two or more CRCs are present in one piece of DCI, signal transmission load may large. One embodiment of the present invention proposes a method for transmitting specific DCI having two CRCs at a specific time, for example, on a specific subframe. A base station may inform the UE of information about the specific subframe, on which the DCI is transmitted, via a higher layer signal such as RRC in a UE-specific manner.

Figure 6:
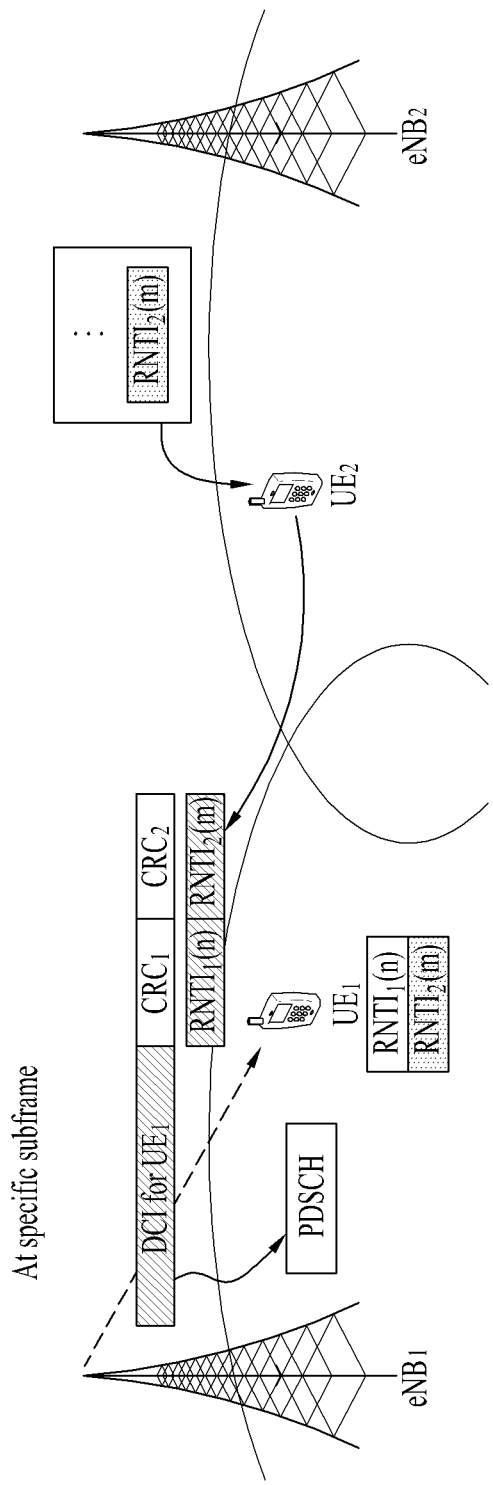
FIG. 6 is an exemplary operation according to one embodiment of the present invention.
Figure 7:
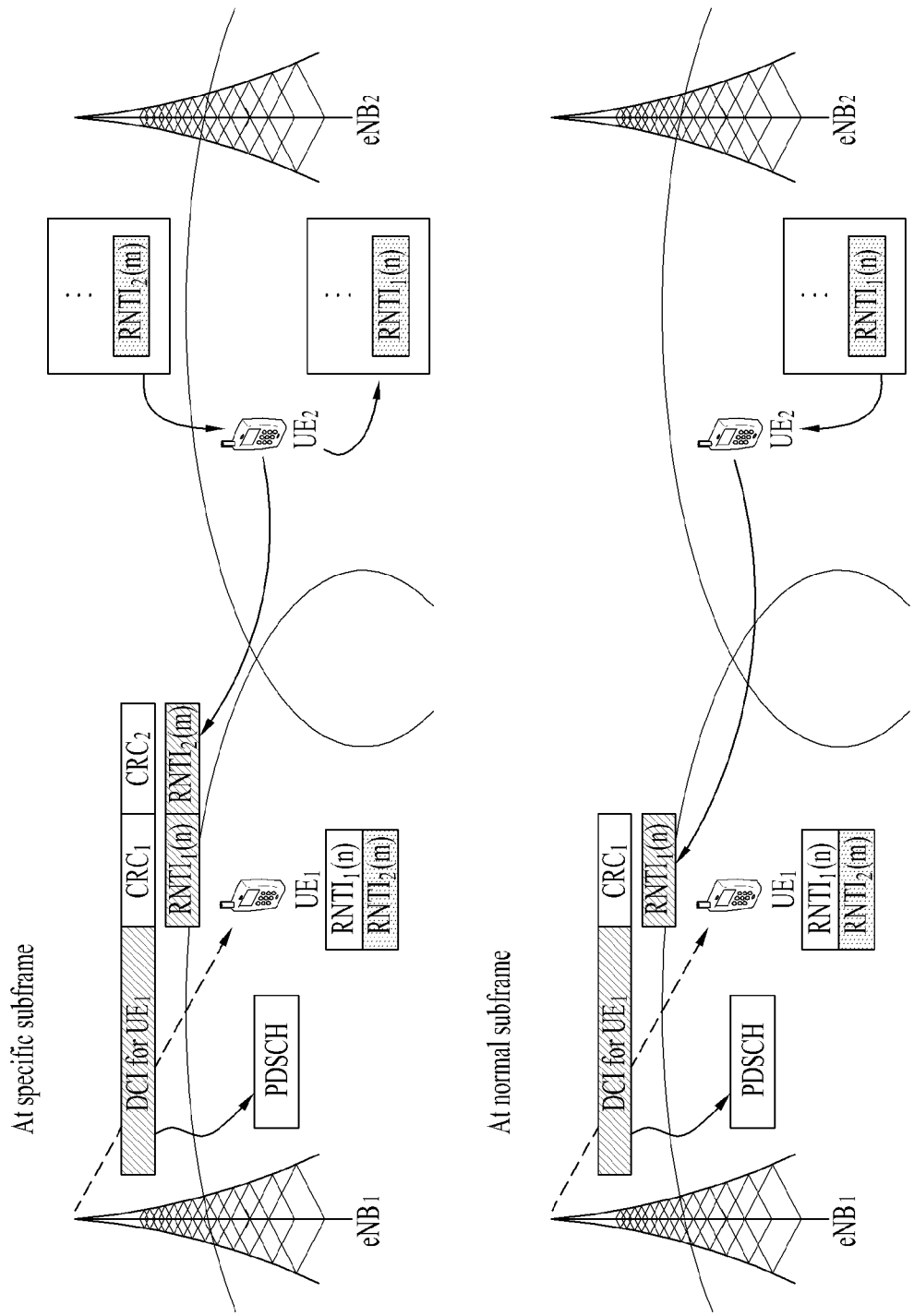
FIG. 7 is an exemplary operation according to one embodiment of the present invention.

FIG. 6 shows operation according to one embodiment of the present invention. When both $CRC_1$ scrambled by $RNTI_1(n)$ and $CRC_2$ scrambled by $RNTI_2(n)$ are present in DCI for $UE_1$, $UE_2$ supporting the NA-IC scheme may reliably detect the DCI based on $CRC_2$ using $RNTI_2$. At this time, $CRC_2$ may be added without being scrambled by $RNTI_2$. Even in this case, $UE_2$ can reliably detect neighboring cell DCI according to $CRC_2$.

According to a detailed embodiment of the present invention, when an NA-IC UE receives DCI including two CRCs (e.g., $CRC_1$ and $CRC_2$) from a neighboring transmission point or base station at a specific time or on a specific subframe, $CRC_1$ is scrambled by one element (e.g., $RNTI_1(n)$) of the UE identifier set (e.g., $RNTI_1$) of a specific transmission point or base station and $CRC_2$ is scrambled by one element (e.g., $RNTI_2(m)$) of a virtual UE identifier set (e.g., $RNTI_2$) defined by the transmission point or base station, a method for configuring $CRC_2$ by adding a bit field to existing DCI or utilizing an existing DCI bit field will be described.

$CRC_2$ according to one embodiment of the present invention may be simply implemented by adding a new bit field to existing DCI. However, this may overload existing DCI. Accordingly, in the present invention, as another method, a method for, at a base station, setting support of only one transport block (TB) in DCI supporting two TBs via a higher layer signal and then utilizing DCI bits for modulation and coding scheme (MCS), new data indication (NDI), redundancy version (RV) information, etc. of a non-transmitted TB as $CRC_2$ will be described. When the NA-IC UE supports cancellation of interference received via a plurality of space layers, implementation complexity may increase. Accordingly, a method of applying an NA-IC scheme to interference of two or fewer space layers may be considered. At this time, the number of TBs may be limited to one. In this case, a DCI bit field of a non-transmitted TB in DCI supporting transmission of two TBs may be generated and used as $CRC_2$ for interference cancellation of the neighboring cell. At this time, $CRC_2$ need not necessarily have the same bit number as $CRC_1$ and $CRC_1$ and $CRC_2$ may have different bit numbers. Preferably, $CRC_2$ may have a bit number less than that of $CRC_1$.

According to another detailed embodiment of the present invention, when an NA-IC UE receives DCI including two CRCs (e.g., $CRC_1$ and $CRC_2$) from a neighboring transmission point or base station at a specific time or on a specific subframe, $CRC_1$ is scrambled by one element (e.g., $RNTI_1(n)$) of the UE identifier set (e.g., $RNTI_1$) of a specific transmission point or base station and $CRC_2$ is scrambled by one element (e.g., $RNTI_2(m)$) of a virtual UE identifier set (e.g., $RNTI_2$) defined by the transmission point or base station, a method for defining an SS of the DCI according to the element included in $RNTI_2$ will be described. Referring to FIG. 6, $UE_2$ supporting the NA-IC scheme should know the SS of the DCI in order to detect the DCI having the two RNTIs. Although the SS of the DCI is defined by the element (e.g., C-RNTI) of $RNTI_1$ according to Equations 1 and 2 in a legacy LTE system, $UE_2$ supporting the NA-IC scheme in FIG. 6 has only advance information of $RNTI_2$ and thus cannot know the SS defined by the element of $RNTI_1$. Accordingly, in one embodiment of the present invention, a method for defining an SS of DCI according to the element of $RNTI_2$ at a specific time or on specific subframe when or on which the DCI having the two RNTIs are transmitted is proposed. Thus, since a UE to which the NA-IC scheme is applied as well as a UE which receives data from the DCI knows information about $RNTI_2$, both UEs can know the SS of the DCI. For example, in FIG. 6, $UE_1$ and $UE_2$ can detect the DCI in the SS derived by substituting the value of $RNTI_2(m)$ for $n_{RNTI}$ of Equation 2.

Second Embodiment

Operation after Specific Time or Specific Subframe

According to another detailed embodiment of the present invention, when an NA-IC UE receives DCI including two CRCs (e.g., $CRC_1$ and $CRC_2$) from a neighboring transmission point or base station at a specific time or on a specific subframe, $CRC_1$ is scrambled by one element (e.g., $RNTI_1(n)$) of the UE identifier set (e.g., $RNTI_1$) of a specific transmission point or base station and $CRC_2$ is scrambled by one element (e.g., $RNTI_2(m)$) of a virtual UE identifier set (e.g., $RNTI_2$) defined by the transmission point or base station, a method for checking RNTI information of a UE ($UE_1$ of FIG. 6) currently scheduled by a neighboring cell using information about $RNTI_1(n)$ corresponding to $RNTI_2(m)$ and utilizing the checked information to detect neighboring cell DCI, that is, interference after the specific time or the specific subframe will be described. Referring to FIG. 6, $UE_2$ supporting the NA-IC scheme reliably detects DCI having the two RNTIs using $RNTI_2(m)$ to confirm the value of $RNTI_1(n)$. As another meaning, $UE_2$ supporting the NA-IC scheme can confirm that $RNTI_1(n)$ is currently scheduled by $eNB_1$ in the state of FIG. 6. When it is assumed that scheduling time is sufficiently long, $UE_2$ supporting the NA-IC scheme may consider $RNTI_1(n)$ as an RNTI of a UE which is likely to be scheduled next time by a neighboring $eNB_1$. Accordingly, in one embodiment of the present invention, the NA-IC UE may receive DCI having the two RNTIs at a specific time to attempt to detect the element of $RNTI_1$ corresponding to $RNTI_2$ and recognize and store the element of $RNTI_1$ as an RNTI of the UE scheduled by the neighboring cell if detection is successful. At this time, the size of the storage may be restricted and the elements of $RNTI_1$ may be updated according to priority with time elapse. Priority may be assigned to a recently detected element of $RNTI_1$ and an old element of $RNTI_1$ may be assumed to be no longer scheduled and may be removed from the storage. At this time, the UE supporting the NA-IC scheme may attempt to detect neighboring cell DCI with respect to the currently scheduled elements of $RNTI_1$ using the managed RNTI information even after the specific time.

Third Embodiment

Legacy UE Support

According to another detailed embodiment of the present invention, a method for transmitting DCI including information about one element of a UE identifier set (e.g., RNTI$_1$) of a specific transmission point or base station in order to support an NA-IC scheme and having CRC scrambled by one element (e.g., RNTI$_2$(m)) of a virtual UE identifier set (e.g., RNTI$_2$) defined by the transmission point or base station will be described. When a UE having RNTI$_1$(n) as an identifier supports legacy operation only, the UE cannot recognize DCI having CRC scrambled by RNTI$_2$(m). Accordingly, in this case, DCI composed of a bit field indicating RNTI$_1$(n) and CRC$_2$ scrambled by RNTI$_2$(m) may be transmitted without information about scheduling in order to provide information about RNTI$_1$(n) to the NA-IC UE. At this time, an entity for transmitting the DCI may be a neighboring cell which may interfere with the NA-IC UE. At this time, the DCI having CRC scrambled by RNTI$_1$(n) may be transmitted simultaneously with the DCI based on RNTI$_2$(m) for scheduling of the UE having RNTI$_1$(n) as an identifier.

Figure 8:
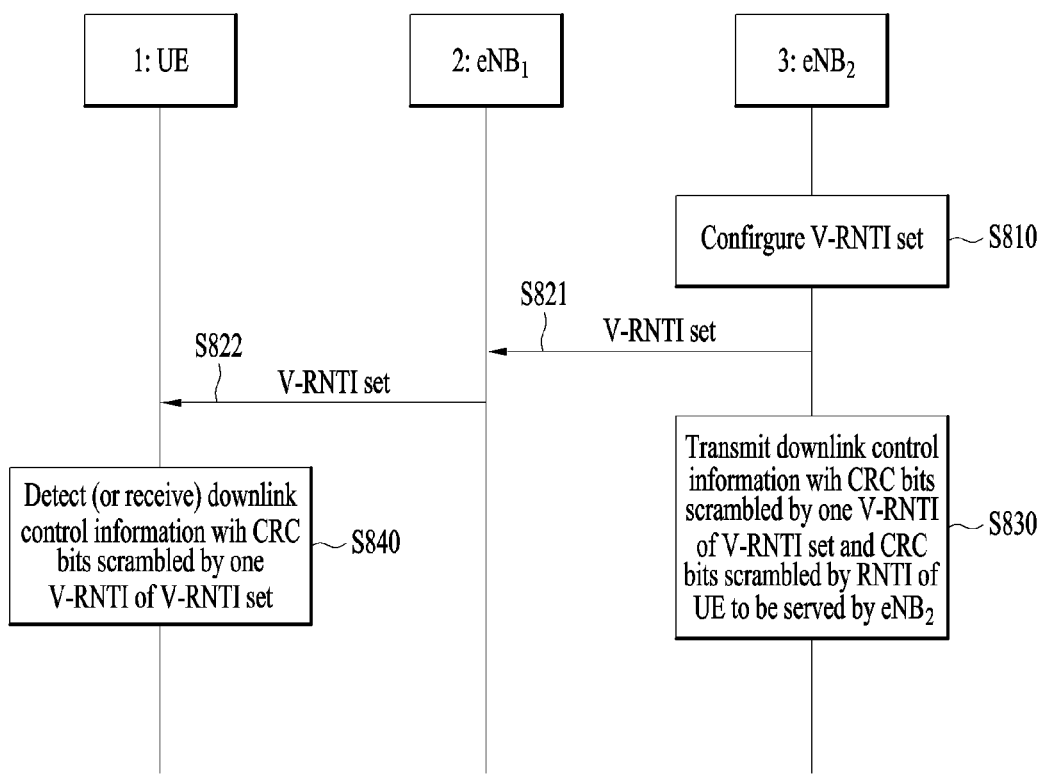
FIG. 8 is an exemplary operation according to one embodiment of the present invention.

FIG. 8 shows operation according to one embodiment of the present invention. A wireless communication system according to one embodiment of the present invention includes a UE 1, a serving eNB$_1$ 2 of the UE and an eNB$_2$ 3 of a neighboring cell and may include more entities.

The eNB$_2$ 3 may transmit interference cancellation information of the UE and transmit interference data to the UE served thereby. The eNB$_2$ 3 may configure a V-RNTI set including a plurality of virtual radio network temporary identifiers (V-RNTIs) for interference cancellation (S810). Each of the plurality of the V-RNTIs may be associated with RNTIs of at least one serving UE and thus C-RNTIs of a plurality of serving UEs may be configured to correspond to one V-RNTI.

The eNB$_2$ 3 may transmit the V-RNTI set to the eNB$_1$ 2 in order to transmit the V-RNTI set to the UE 1 served by eNB$_1$ 2 (S821). Transmission of the V-RNTI may be performed via a backhaul link between eNBs. The eNB$_1$ 2 may transmit the V-RNTI set to the UE 1 served thereby (S822). The V-RNTI set may be transmitted to the UE 1 in a semi-static manner, for example, via higher layer signaling.

The eNB$_2$ 3 may transmit a downlink control channel including cyclic redundancy check (CRC) bits scrambled by at least one V-RNTI of the V-RNTI set and CRC bits scrambled by the RNTI of the UE served by the eNB$_2$ 3 (S830). That is, the downlink control channel is a double CRC-downlink control channel including two CRC bits scrambled by two RNTIs.

Since the downlink control channel is transmitted to a UE (that is, the UE 1 of FIG. 8) other than the UE which is expected to receive the downlink control channel, at least one V-RNTI is used for transmission of the downlink control channel. In addition, since the UE 1 cannot know the RNTI of the UE served by the eNB$_2$ 3, the UE 1 is informed of a separate V-RNTI and the CRC scrambled by the V-RNTI is included in the downlink control channel.

The downlink control channel is for a specific UE served by the eNB$_2$ 3 but may interfere with the UE 1 served by the eNB$_1$ 2 adjacent to the eNB$_2$ 3. Accordingly, the UE 1 may detect or receive the double CRC-downlink control channel using at least one V-RNTI of the V-RNTI set received in S822 (S840). The double CRC-downlink control channel may be received in a search space determined by the at least one V-RNTI.

Then, the UE 1 may detect interference data caused due to the neighboring cell using the information transmitted via the received downlink control channel and cancel the detected interference data from the data received when the interference data is detected (e.g., on the same subframe).

The embodiment related to FIG. 8 may alternatively or additionally include at least some of the above-described embodiment(s).

Figure 9:
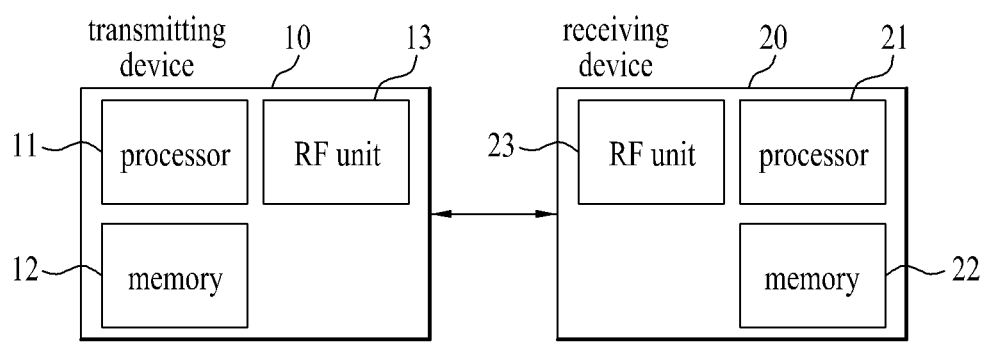
FIG. 9 is a block diagram of an apparatus for implementing embodiment(s) of the present invention.

FIG. 9 is a block diagram showing components of a transmitter 10 and a receiver 20 for performing the embodiments of the present invention. The transmitter 10 and the receiver 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer. The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), Digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitter 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiver 20 is the inverse of signal processing of the transmitter 10. Under control the processor 21, the RF unit 23 of the receiver 20 receives a radio signal transmitted by the transmitter 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitter 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiver 20. A reference signal (RS) transmitted in correspondence with the antenna defines the antenna viewed from the viewpoint of the receiver 20 and enables the receiver 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operate as the transmitter 10 in uplink and operates as the receiver 20 in downlink. In the embodiments of the present invention, a BS operates as the receiver 20 in uplink and operates as the transmitter 10 in downlink.

The transmitter and/or the receiver may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention may be used for a wireless communication apparatus such as a user equipment (UE), a relay and a base station (BS).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for receiving interference cancellation information of a mobile station (MS), the method being performed by the MS, the method comprising:
receiving a virtual radio network temporary identifier (V-RNTI) set including a plurality of V-RNTIs from a serving base station (BS), a specific V-RNTI among the plurality of V-RNTIs being associated with at least two MSs served by a neighboring BS ("neighboring MSs"); and
receiving, in a specific subframe, a double cyclic redundancy check (CRC)-downlink control information (DCI) for a specific neighboring MS among the neighboring MSs, which includes a first CRC bit scrambled by a specific cell-RNTI (C-RNTI) for the specific neighboring MS and a second CRC bit scrambled by the specific V-RNTI, using the specific V-RNTI.

2. The method according to claim 1, wherein the double CRC-DCI is received in a search space determined by the specific V-RNTI.

3. The method according to claim 1, further comprising:
detecting interference data caused due to the neighboring BS using information included in the received double CRC-DCI; and
cancelling the detected interference data from total received data.

4. The method according to claim 1, wherein the V-RNTI set is received via a higher layer signal.

5. The method according to claim 1, further comprising:
acquiring the specific C-RNTI from the double CRC-DCI; and
receiving, after the specific subframe, a DCI for the specific neighboring MS using the acquired specific C-RNTI.

6. The method according to claim 1, further comprising receiving information on the specific subframe via a higher layer signal.

7. A method for transmitting interference cancellation information of a mobile station (MS), the method being performed by a base station (BS), the method comprising:
configuring a virtual radio network temporary identifier (V-RNTI) set including a plurality of V-RNTIs, a specific V-RNTI among the plurality of V-RNTIs being associated with at least two serving MSs; and
transmitting, in a specific subframe, a double cyclic redundancy check (CRC)-downlink control information (DCI) for a specific serving MS among the serving MSs, which includes a first CRC bit scrambled by a specific cell-RNTI (C-RNTI) for the specific serving MS and a second CRC bit scrambled by the specific V-RNTI, using the specific V-RNTI.

8. The method according to claim 7, wherein the double CRC-DCI is transmitted in a search space determined by the specific V-RNTI.

9. The method according to claim 7, further comprising transmitting information on the specific subframe to a neighboring BS.

10. The method according to claim 7, further comprising transmitting the V-RNTI set to a neighboring BS to transmit the V-RNTI set to an MS served by the neighboring BS.

11. A mobile station (MS) configured to receive interference cancellation information, the MS comprising:
a radio frequency (RF) unit; and
a processor configured to:
control the RF unit;
receive a virtual radio network temporary identifier (V-RNTI) set including a plurality of V-RNTIs from a serving base station (BS), a specific V-RNTI among the plurality of V-RNTIs being associated with at least two MSs served by a neighboring BS ("neighboring MSs"); and
receive, in a specific subframe, a double cyclic redundancy check (CRC)-downlink control information (DCI) for a specific neighboring MS among the neighboring MSs, which includes a first CRC bit scrambled by a specific cell-RNTI (C-RNTI) for the specific neighboring MS and a second CRC bit scrambled by the specific V-RNTI, using the specific V-RNTI.

12. A base station (BS) configured to transmit interference cancellation information, the BS comprising:

a radio frequency (RF) unit; and a processor configured to:

control the RF;

configure a virtual radio network temporary identifier (V-RNTI) set including a plurality of V-RNTIs, a specific V-RNTI among the plurality of V-RNTIs being associated with at least two serving MSs; and transmit, in a specific subframe, a double cyclic redundancy check (CRC)-downlink control information (DCI) for a specific serving MS among the serving MSs, which includes a first CRC bit scrambled by a specific cell-RNTI (C-RNTI) for the specific serving MS and a second CRC bit scrambled by the specific V-RNTI, using the specific V-RNTI.

* * * * *